(12) United States Patent
Linkletter (10) Patent No.: US 11,021,199 B2
(45) Date of Patent: Jun. 1, 2021

(54) FOLDABLE TRANSPORTATION TRAILER

(71) Applicant: Wayne Linkletter, Summerside (CA)

(72) Inventor: Wayne Linkletter, Summerside (CA)

(*) Notice: Subject to any disclaimer, the term of this patent is extended or adjusted under 35 U.S.C. 154(b) by 276 days.

(21) Appl. No.: 16/253,536

(22) Filed: Jan. 22, 2019

(65) Prior Publication Data

US 2020/0231233 A1 Jul. 23, 2020

(51) Int. Cl.
*B62D 63/06* (2006.01)
*B62D 63/08* (2006.01)

(52) U.S. Cl.
CPC ........... *B62D 63/061* (2013.01); *B62D 63/08* (2013.01)

(58) Field of Classification Search
CPC .............................. B62D 63/061; B62D 63/08
See application file for complete search history.

(56) References Cited

U.S. PATENT DOCUMENTS

| | | | | |
|---|---|---|---|---|
| 4,362,316 A * | 12/1982 | Wright | ................. | B62D 63/061 280/491.3 |
| 4,786,073 A * | 11/1988 | Harper | ................. | B62D 63/061 280/491.1 |
| 5,725,346 A * | 3/1998 | Davina | ................. | A01D 90/08 280/491.1 |
| 6,238,170 B1 * | 5/2001 | Pingry | ................. | A01B 51/04 172/311 |
| 6,254,117 B1 * | 7/2001 | Cross | ................. | B60D 1/155 280/401 |
| 6,767,025 B2 * | 7/2004 | Hagen | ................. | B62D 63/061 280/401 |
| 6,834,882 B1 * | 12/2004 | Boyd | ................. | B62D 63/061 280/418.1 |
| 7,237,294 B2 * | 7/2007 | Lensing | ................. | B65G 69/30 14/69.5 |
| 7,243,979 B1 * | 7/2007 | Stene | ................. | B60P 1/027 296/163 |
| 7,540,528 B2 * | 6/2009 | Spainhower | ......... | B62D 63/061 280/415.1 |
| 7,780,185 B2 * | 8/2010 | McConkey | .......... | B62D 63/061 280/656 |
| 8,051,519 B1 * | 11/2011 | Adams | ................ | B60P 1/43 14/71.1 |
| 8,123,455 B2 * | 2/2012 | Chamoun | ............ | B62D 63/061 414/537 |
| 8,146,941 B2 * | 4/2012 | Steins | ................. | B62D 63/061 280/656 |
| 8,360,462 B2 * | 1/2013 | Mayfield | .............. | B62D 63/061 280/656 |
| 9,056,639 B2 * | 6/2015 | Bank | ................. | B62D 63/061 |
| 9,527,355 B1 * | 12/2016 | Blevins | .................. | B60D 1/46 |
| 9,725,024 B1 * | 8/2017 | Davis | .................. | B62D 63/061 |
| 9,919,754 B2 * | 3/2018 | Chamoun | ............ | B62D 63/061 |
| 10,081,402 B1 * | 9/2018 | Davis | ........................ | B60P 1/18 |
| 2001/0026060 A1 * | 10/2001 | Cross | .................... | B60D 1/155 280/456.1 |

(Continued)

*Primary Examiner* — Jacob B Meyer (57) ABSTRACT

A foldable transportation trailer able to be folded in two separate locations to enable the folded trailer to assume a vertical position behind the vehicle towing it, when not in use, thus providing a substantially minimal footprint to the trailer in its compacted state. In this manner, when compacted and folded, the trailer reduces from an elongated length of approximately 20 feet, to a length of 3 feet when compacted.

2 Claims, 7 Drawing Sheets

(56) References Cited

U.S. PATENT DOCUMENTS

| | | | | |
|---|---|---|---|---|
| 2002/0195798 A1* | 12/2002 | James | B62D 63/061 | 280/656 |
| 2003/0214117 A1* | 11/2003 | Steins | B62D 63/061 | 280/656 |
| 2004/0032114 A1* | 2/2004 | Hagen | B62D 63/061 | 280/656 |
| 2004/0032142 A1* | 2/2004 | Sherrer | B62D 33/0273 | 296/61 |
| 2005/0184485 A1* | 8/2005 | Timmermans | B62D 63/061 | 280/656 |
| 2006/0091646 A1* | 5/2006 | Steins | B62D 63/061 | 280/656 |
| 2006/0117502 A1* | 6/2006 | Lensing | B65G 69/30 | 14/69.5 |
| 2006/0279071 A1* | 12/2006 | Spainhower | B62D 63/062 | 280/656 |
| 2007/0018429 A1* | 1/2007 | Randall | B62D 63/061 | 280/491.1 |
| 2007/0182150 A1* | 8/2007 | Simpson | B62D 63/061 | 280/789 |
| 2008/0157493 A1* | 7/2008 | McConkey | B62D 63/061 | 280/40 |
| 2008/0159838 A1* | 7/2008 | Sherer | B60P 1/435 | 414/537 |
| 2009/0134605 A1* | 5/2009 | Norton | B62D 63/062 | 280/656 |
| 2010/0032918 A1* | 2/2010 | Chamoun | B62D 63/061 | 280/30 |
| 2011/0266776 A1* | 11/2011 | Kapels | B60D 1/52 | 280/656 |
| 2012/0204360 A1* | 8/2012 | Chamoun | B62D 63/061 | 14/2.4 |
| 2012/0313346 A1* | 12/2012 | Steins | B62D 63/061 | 280/401 |
| 2013/0015636 A1* | 1/2013 | Shepard | B62D 63/061 | 280/415.1 |
| 2013/0038038 A1* | 2/2013 | Bernard | B62D 63/061 | 280/415.1 |
| 2014/0161575 A1* | 6/2014 | Parker | B60P 1/4414 | 414/546 |
| 2014/0312593 A1* | 10/2014 | Bank | B62D 63/061 | 280/400 |
| 2015/0321716 A1* | 11/2015 | Patterson | E04H 15/56 | 296/26.09 |
| 2016/0059915 A1* | 3/2016 | Eatherington | B62D 63/061 | 280/415.1 |
| 2017/0057577 A1* | 3/2017 | Blevins | B60P 1/027 | |
| 2018/0215302 A1* | 8/2018 | Reid | B60P 1/08 | |
| 2018/0257721 A1* | 9/2018 | Johnson | B62D 63/062 | |
| 2020/0079266 A1* | 3/2020 | Hoehner | B62D 29/02 | |
| 2020/0231233 A1* | 7/2020 | Linkletter | B62D 63/061 | |
| 2020/0353855 A1* | 11/2020 | Gastrich | B60P 3/077 | |

\* cited by examiner

FOLDABLE TRANSPORTATION TRAILER

FIELD OF THE INVENTION

The invention relates to a foldable transportation trailer, and, more particularly, to a foldable transportation trailer which is operably able to be folded in two separate locations to enable the folded trailer to assume a vertical position behind the vehicle towing it, when not in use, thus providing a substantially minimal footprint to the trailer in its compacted state.

BACKGROUND OF THE INVENTION

It is well known that trailers can be used to transport, for example, a personal vehicle or other similar transportation vehicles/equipment behind a motor coach or any other large tow vehicle.

However, such trailers/trailer beds typically can be up to 20 feet or more in length, and thus, especially when not in use, can take up a larger footprint than is desired. For example, many camp grounds will not allow coaches/tow vehicles when they are towing such a trailer as these can take up too much room.

It would be beneficial to provide an improved foldable transportation trailer which is operably able to be folded to assume a vertical position behind the vehicle towing it, so that when folded it only takes up approximately three feet of length behind the motor coach/vehicle.

Further, it would be advantageous to provide an improved foldable transportation trailer which is operably able to be folded in two separate locations to enable the folded trailer to assume a vertical position behind the vehicle towing it, when not in use, thus providing a substantially minimal footprint to the trailer. To this end, the present invention effectively addresses these needs.

SUMMARY OF THE INVENTION

The present invention provides the advantage of an improved foldable transportation trailer which is operably able to be folded to assume a vertical position behind the vehicle towing it, so that when folded it only takes up, for example, approximately three feet of length behind the motor coach/vehicle.

The present invention also provides the advantage of an improved foldable transportation trailer which is operably able to be folded in two separate locations to enable the folded trailer to assume a vertical position behind the vehicle towing it, when not in use, thus providing a substantially minimal footprint to the trailer.

According to a first broad aspect of the present invention, there is disclosed a foldable transportation trailer comprising a trailer bed pivotably foldable in at least two locations thereon so as to assume a substantially vertical position when desired behind a towing vehicle; and a trailer hitch for attaching the trailer bed to the towing vehicle.

According to another broad aspect of the present invention, there is provided foldable transportation trailer comprising a foldable transportation trailer comprising a trailer bed pivotably foldable in at least two locations thereon so as to assume a substantially vertical position when desired behind a towing vehicle, the trailer bed further comprising a rear trailer bed portion, middle trailer bed portion and a front trailer bed portion; and a trailer hitch for attaching the trailer bed to the towing vehicle.

According to another broad aspect of the present invention, there is disclosed a method of manufacturing a foldable transportation trailer comprising providing a trailer bed pivotably foldable in at least two locations thereon so as to assume a substantially vertical position when desired behind a towing vehicle; and providing a trailer hitch for attaching the trailer bed to the towing vehicle.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

The invention will be described for the purposes of illustration only in connection with certain embodiments. However, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Figure 1:
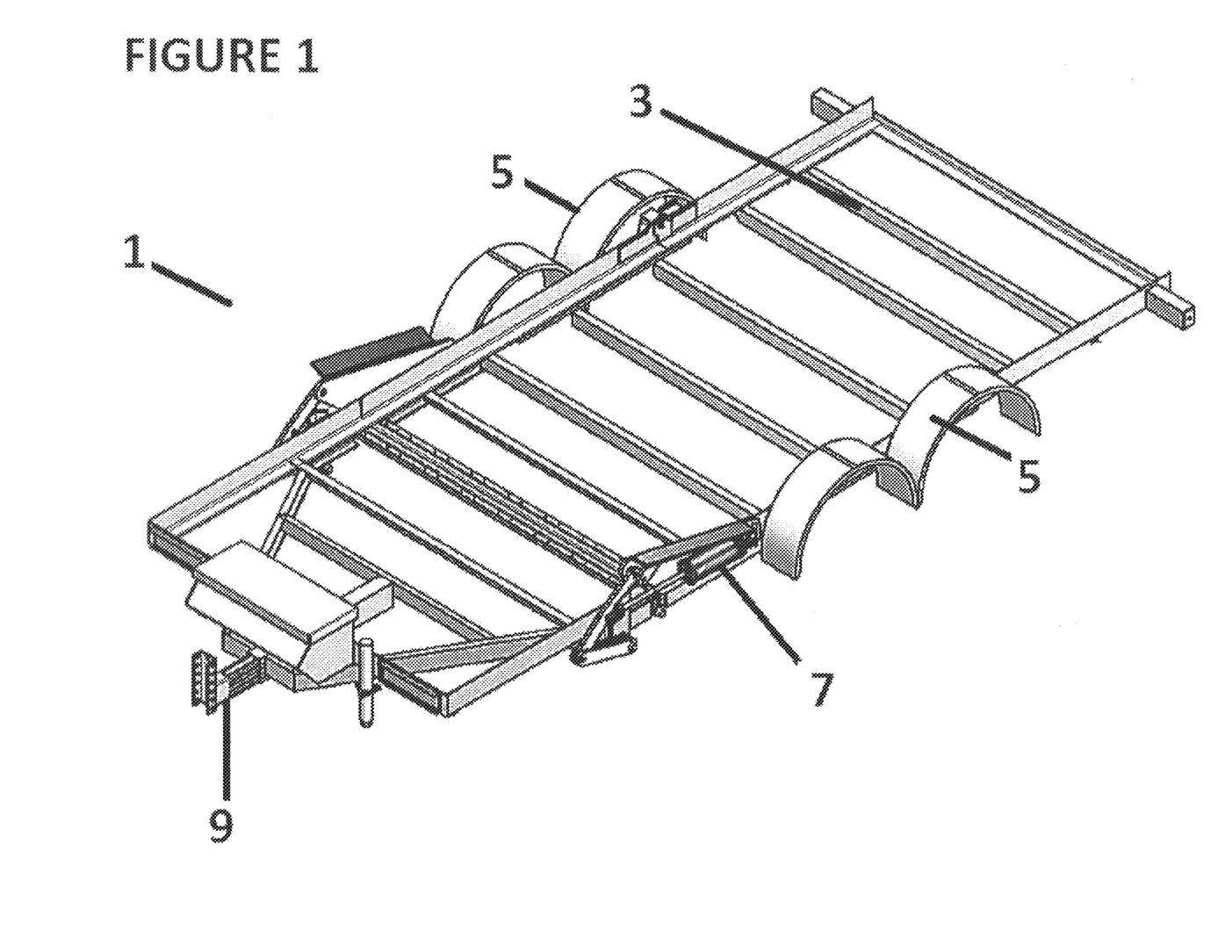
FIG. 1 is a perspective view of the foldable transportation trailer according to an embodiment of the present invention.

Referring to FIG. 1, there is shown the foldable transportation trailer 1 according to an exemplary embodiment of the present invention. In an exemplary embodiment, the length of such a trailer will be approximately 20 feet long, though it would be understood by one skilled in the art that this length could be varied.

In an exemplary embodiment, the trailer 1 comprises at least a trailer bed 3, wheel hubs 5 for accommodating wheels (not shown), a front hydraulic extending piston 7, and a trailer hitch 9.

Figure 2:
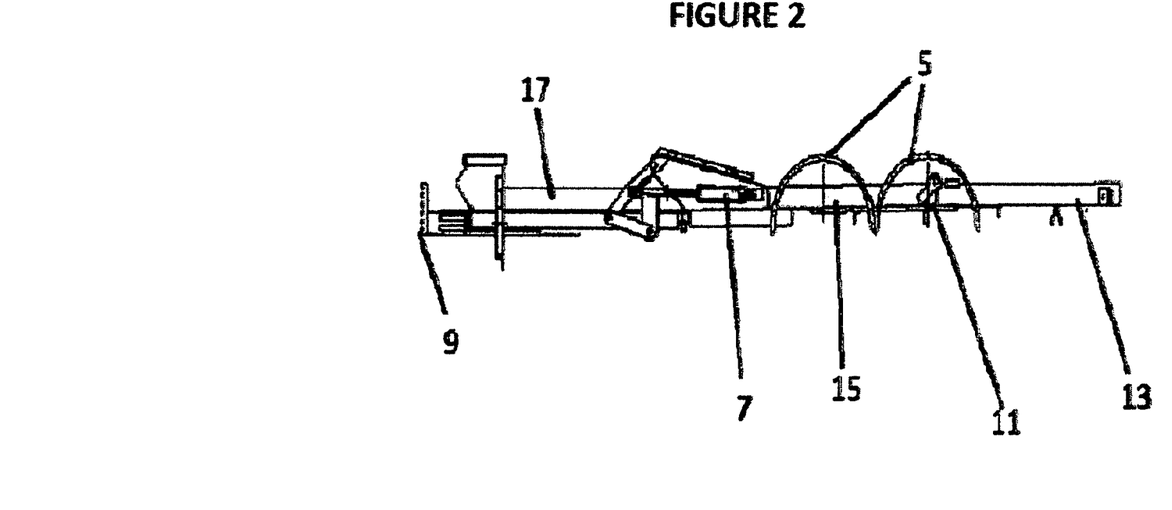
FIG. 2 is a side view of the foldable transportation trailer shown in FIG. 1.
Figure 3:
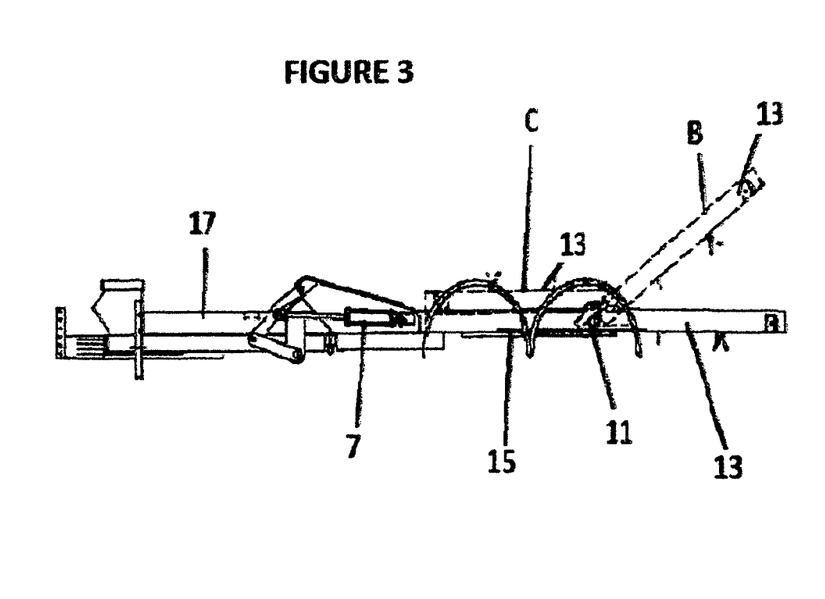
FIG. 3 is a side view of the embodiment of the foldable transportation trailer shown in FIGS. 1 and 2, illustrating the rear trailer bed portion beginning to be folded, and then ultimately folded, unto the middle trailer bed portion.
Figure 4:
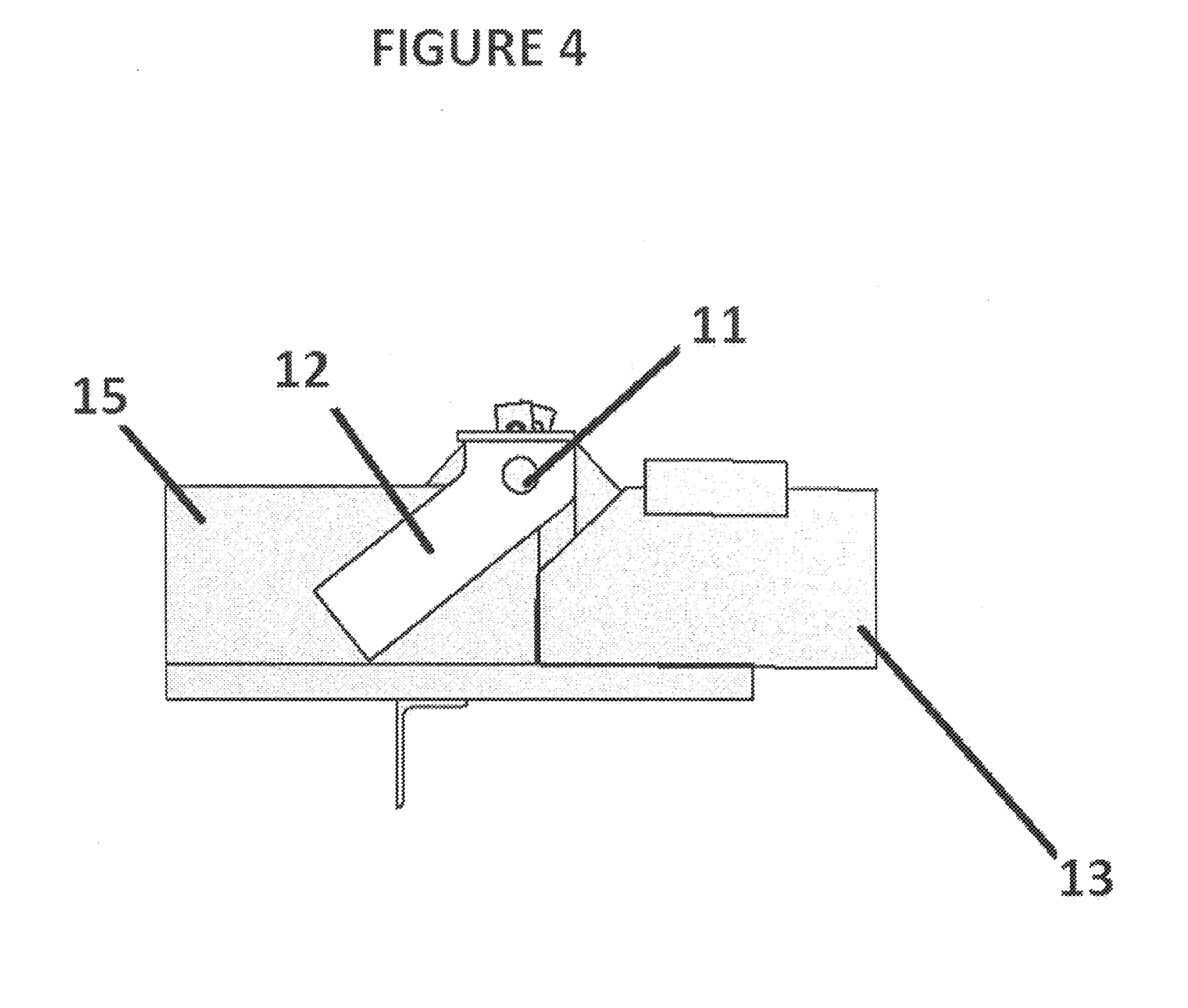
FIG. 4 is a side view of an embodiment of the rear pivot point which is utilized to enable the rear trailer bed portion to fold over when desired unto the middle trailer bed portion.

With reference to FIG. 2, it can be seen that the trailer bed further comprises a rear trailer bed portion 13, a middle trailer bed portion 15 and a front trailer bed portion 17. FIG. 3 illustrates how the trailer bed can begin to compact. In FIG. 3, it can be seen that rear trailer bed portion 13, by means of rear pivot point 11, begins to move to a compacting position, to first achieve position B shown in FIG. 3, then to ultimately assume position C shown in FIG. 3, whereby the rear trailer bed portion 13 assumes a rested and folded position on top of middle trailer bed portion 15. FIG. 4 illustrates the rear pivot point 11, which is integrated with pivot arm 12 that is integrally connected to middle trailer bed portion 15.

Figure 5:
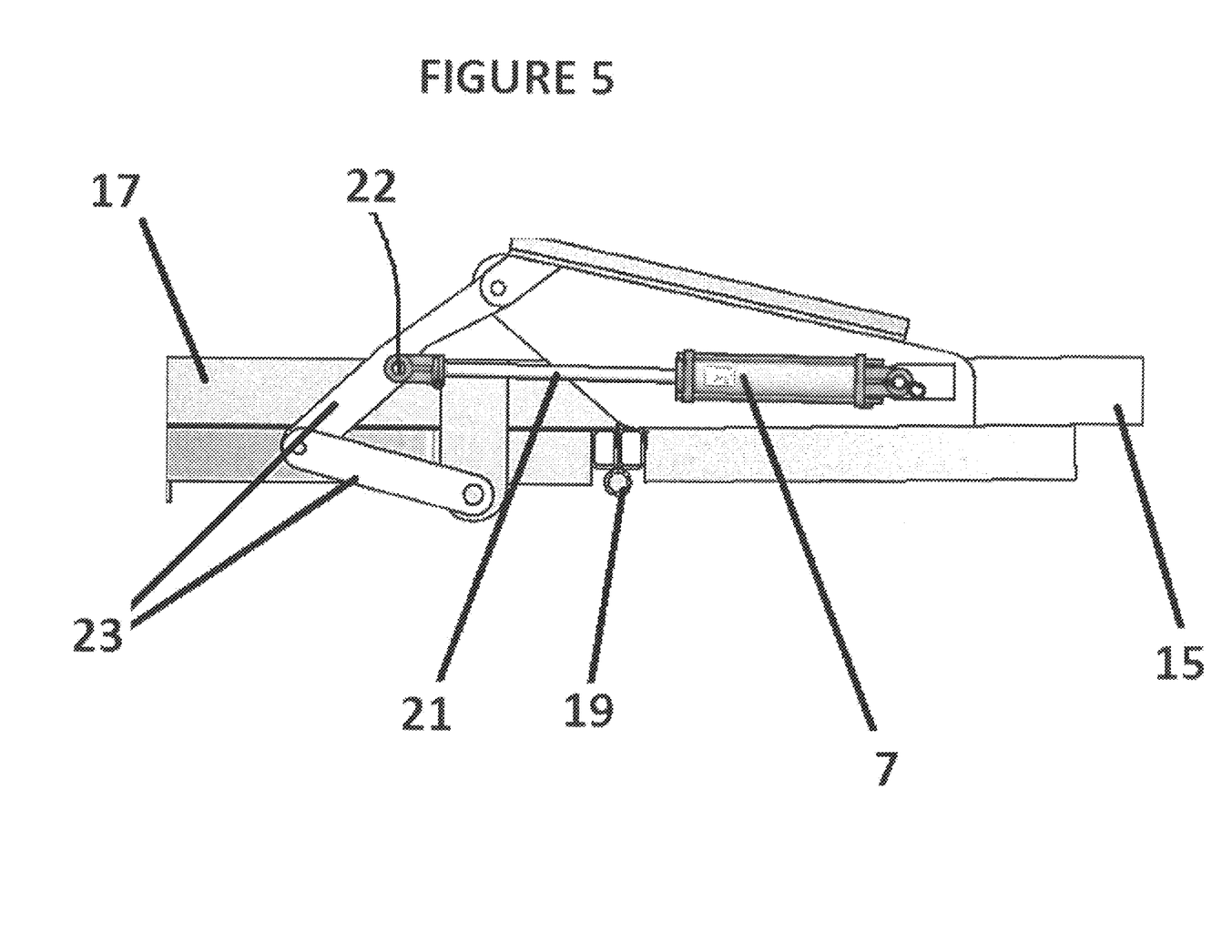
FIG. 5 is a side view of an embodiment of the front hydraulic extending piston.
Figure 6:
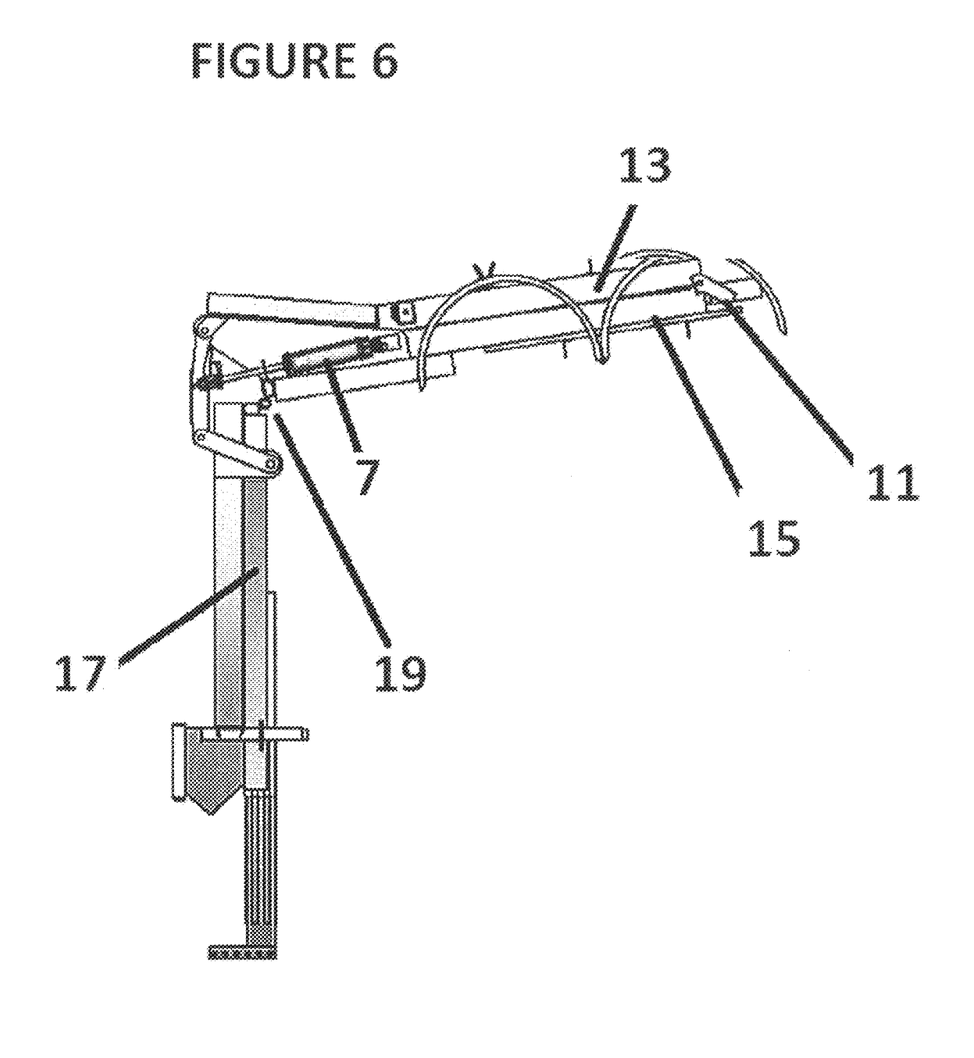
FIG. 6 is a side view of the compacted trailer bed portion and the middle trailer bed portion about to be further folded over unto the front trailer bed portion to assume a substantially vertical position.
Figure 7:
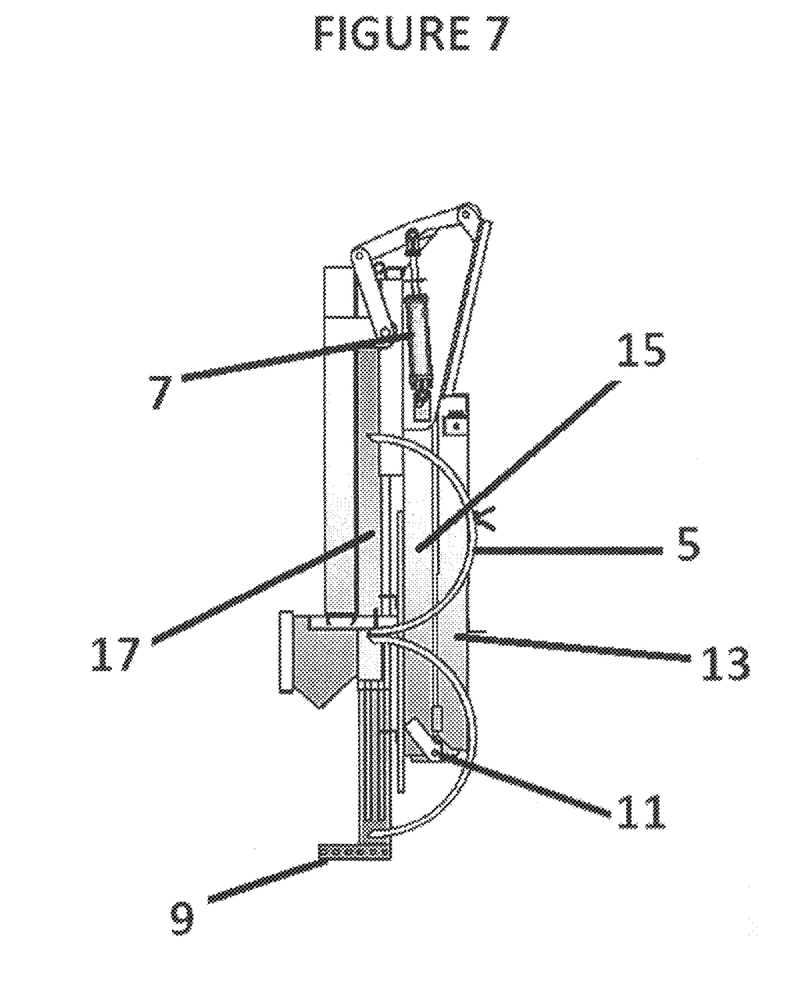
FIG. 7 is a side view of the fully compacted trailer bed portion assuming a substantially vertical position.

With reference to FIG. 5, there can be seen the interconnection between middle trailer bed portion 15 and front trailer bed portion 17. In this Figure, these portions are joined and interconnected by front hydraulic extending piston 7 having an extendable and retractable rod portion 21, which is connected to middle trailer bed portion 15, and has an opposite end thereof 22 connected to front trailer bed portion 17. Pivotable arms 23 are integrated with this opposite end 22. In compacting the trailer, after the first step of the rear trailer bed portion 13 assuming a rested and folded position on top of middle trailer bed portion 15 (as shown in FIG. 3) the next step in compacting the trailer involves (as shown in FIG. 6) the fully compacted rear trailer bed portion 13 and middle trailer bed portion 15 being pivotably movable about hinge pivot 19, which is interconnected between front trailer bed portion 17 and middle trailer bed portion 15, whereby when front hydraulic extending piston 7 is actuated, retractable rod portion 21 retracts, thus bringing the interconnected and fully compacted rear trailer bed portion 13 and middle trailer bed portion 15 to reside against the front trailer bed portion 17 in a substantially vertical position, as shown in FIG. 7. Once the trailer is in a substantially vertical position, it can be locked and secured hydraulically, or by other conventional means, as would be readily apparent to one skilled in the art.

It will also be apparent to those skilled in this art that various modifications and variations may be made to the embodiments disclosed herein. Other embodiments consistent with the present invention will become apparent from consideration of the specification and the practice of the invention disclosed therein.

Accordingly, the specification and the embodiments are to be considered exemplary only, with a true scope of the invention being disclosed by the following claims.

I claim:

1. A foldable transportation trailer comprising:
   a trailer bed pivotably foldable in at least two locations thereon, the trailer bed further comprising a rear trailer bed portion, middle trailer bed portion and a front trailer bed portion, the front trailer bed portion having a first pivot arm pivotably connected thereto and the middle trailer bed portion having a second pivot arm pivotably connected thereto, the first pivot arm and the second pivot arm further being pivotably connected to one another;
   at least one hydraulic piston having a first end connected to the middle trailer bed portion and a second end connected to at least one of the first pivot arm and the second pivot arm;
   whereby, the rear trailer bed portion can be folded over and compacted to reside on the middle trailer bed portion, wherein the compacted rear trailer bed portion and the middle trailer bed are pivotably foldable about a hinge pivot connected to each of the front trailer bed portion and the middle trailer bed portion to reside against the front trailer bed portion so that the foldable transportation trailer is operably to assume a substantially vertical position when desired behind a towing vehicle; and
   a trailer hitch for attaching the foldable transportation trailer to the towing vehicle, the foldable transportation trailer having a substantially minimal footprint of about three feet in length behind the towing vehicle.

2. A method of manufacturing a foldable transportation trailer comprising:
   providing a trailer bed having a rear trailer bed portion, middle trailer bed portion and a front trailer bed portion that is pivotably foldable in at least two locations thereon;
   providing the front trailer bed portion with a first pivot arm pivotably connected thereto and providing the middle trailer bed portion with a second pivot arm pivotably connected thereto;
   pivotably connecting the first pivot arm and the second pivot arm to one another;
   providing at least one hydraulic piston having a first end connected to the middle trailer bed portion and a second end connected to at least one of the first pivot arm and the second pivot arm;
   providing the rear trailer bed portion to be operably able to be folded over and compacted to reside on the middle trailer bed portion, the compacted rear trailer bed portion and the middle trailer bed being pivotably foldable about a hinge pivot connected to each of the front trailer bed portion and the middle trailer bed portion to reside against the front trailer bed portion so that the foldable transportation trailer is operably to assume a substantially vertical position when desired behind a towing vehicle; and
   providing a trailer hitch for attaching the trailer bed to the towing vehicle so that the foldable transportation trailer possesses a substantially minimal footprint of about three feet in length behind the towing vehicle.

* * * * *